April 19, 1955 O. L. DUPY 2,706,752

MAGNETIC HEAD

Filed May 6, 1950

INVENTOR.

OLIN L. DUPY

BY James B. Christie

ATTORNEY.

United States Patent Office 2,706,752

Patented Apr. 19, 1955

2,706,752

MAGNETIC HEAD

Olin L. Dupy, Los Angeles, Calif.

Application May 6, 1950, Serial No. 160,530

4 Claims. (Cl. 179—100.2)

This invention is concerned with magnetic recording equipment and provides an improved electromagnetic head for recording or play-back purposes. The head of the invention is simple, inexpensive and reliable and in its preferred form is particularly applicable to multichannel recording on and pick up from a magnetizable tape.

In magnetic recording a magnetizable body such as a tape, wire, disk or cylinder is passed through the field of an electromagnet, which is variably energized through an electronic amplifier or the like, in response to variation of a wave motion, say speech or music, to be recorded. Successive portions of the body are thus magnetized in varying amount. Upon play-back, the magnetized body passes a magnetizable pick-up or head, the magnetization of which varies depending upon the particular section of the body in proximity with the head at a given instant. A coil is wrapped around the pick-up and a voltage is induced therein which varies as the magnetism changes. The voltage is amplified and converted into sound or other waves with conventional equipment.

In certain operations, as when a number of seismic waves are picked up and recorded simultaneously side by side on a tape, it is extremely desirable that the recording and play-back heads be very small, so that a number of channels can be recorded side by side on a narrow tape without interference or overlap between channels. The head of my invention is so designed that it can be constructed in very small sizes without sacrifice in fidelity of recording or play-back and permits a large number of "traces" to be placed side by side for multichannel operations.

Generally speaking, the head of my invention comprises a U-shaped magnetizable base member and two pole pieces held respectively in contact with the two legs of the U. The front ends of the two pole pieces are separated by a small gap, being held in proper position by a non-magnetizable spacer such as a brass rod. The particular spacing depends upon the frequency range of the waves to be recorded and played back, but is relatively small.

The two front ends of the pole pieces should be lapped, or otherwise worked to assure that their surfaces are flat and parallel, and it is also desirable to coat these end surfaces, the coating serving to hold the pole pieces apart by the required amount. The coatings should be non-magnetizable, and may be produced on the end by plating or by a coating composition. I prefer to form the coating by plating. Thus the ends of iron pole pieces may be dipped momentarily into a soluble copper solution. A replacement reaction occurs and the copper is plated out onto the end surfaces, the thickness of coating thus formed being controlled by controlling the concentration of copper in the solution or the dipping time, or both. The size of the gap between pole pieces may be set with great accuracy by controlling the thickness of coating on one or both pole pieces, thus setting the frequency response of the head permanently and accurately.

I prefer to construct the head of my invention so that the sides of the pole pieces respectively overlap the sides of the U-shaped base member and are in good magnetic contact therewith, thus producing a good magnetic path.

In assembling the head of my invention, I prefer to plate the ends of the pole pieces, and then fasten them together with a brass tie or spacer while the pole pieces are accurately disposed in a jig. If a number of heads are incorporated in a single unit for multichannel work, several sets of pole pieces are jigged together, and a single transverse non-magnetizable spacer is fastened to all the sets. In such case, the U-shaped base members are also jigged together and tied together with a single transverse non-magnetizable member. Afterward the joined U's and the joined sets of pole pieces are united together in a single structure, with appropriate magnetic shielding between the heads.

My invention will be more clearly understood in the light of the following detailed description taken in conjunction with the accompanying drawing, wherein.

Figure 1:
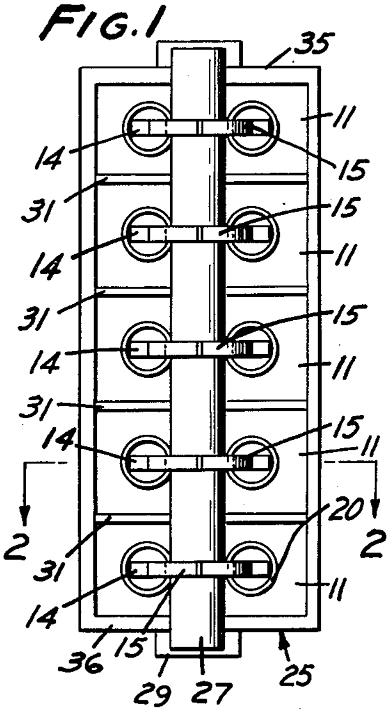
Fig. 1 is a bottom view of a presently preferred embodiment of a multichannel head of my invention.
Figure 2:
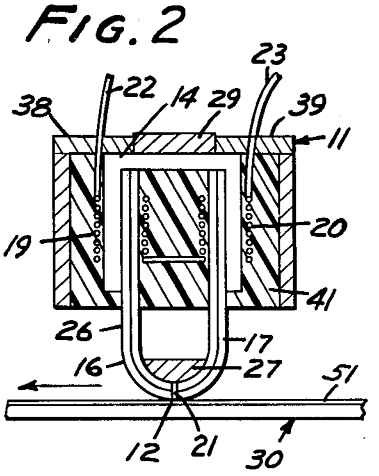
Fig. 2 is a sectional view along line 2—2 of the apparatus of Fig. 1.

Each head 11 of the apparatus of Figs. 1 and 2 is essentially an electromagnet with a closed magnetic circuit, save for a small gap 12. The magnetic head includes a U-shaped magnetizable base member 14 of soft iron or the like, with the legs of the U respectively held in overlapping contact with a pair of pole pieces 16, 17 (Fig. 2) and two connected magnetic series-aiding coils 19, 20 respectively wrapped around a single one of the pole pieces and its associated one of the legs of the U. The front ends of the two pole pieces are spaced apart, forming the small gap 12 which is occupied by a non-magnetizable member 21, preferably copper. The coils are connected by leads 22, 23 to an amplifier (not shown).

As shown in Fig. 1, the multichannel head of the invention comprises five individual heads 11 arranged in side by side parallel relationship in a small partitioned sheet-steel case 25. The partitioned case shields each individual head from the magnetic fields of its neighbors and from any stray fields, such as that of an adjacent drive motor.

Five pairs 26 of pole pieces are held in an equally spaced parallel relationship (Fig. 3) by a half round elongated non-magnetizable bar 27, preferably brass, which is soldered to each of the pairs. This bar also serves to maintain the gap between the front ends of the two pole pieces of each individual head. Five U-shaped base members 14 (Fig. 4) are held in a like spacial relationship by an elongated non-magnetic strap 29 centrally soldered to the base of each of the U members.

The sheet-steel case, which is rectangular in shape, has four sheet-steel partitions 31 dividing the case into five compartments. The strap 29 with its five depending U members rests in two rectangular slots (not shown) in the central tope edges of two end members 35, 36 of the case. The top edges of the four partitions abut the under side of the positioned strap, providing additional support. Two parallel non-magnetizable members 38, 39 (see Fig. 2) on either side of the strap are fastened to the sides and the ends of the case, thereby holding the U member assembly in position. The pole piece assembly made up of the bar and the five attached pairs of pole pieces is held in the case by a suitable insulating cement 41, say polystyrene, each of the pole pieces being overlapped by a leg of one of the U's.

The parts of the assembly should be fabricated and assembled with exactitude.

The pole pieces may be either solid or laminated. The laminations should run longitudinally, preferably as shown in Fig. 2. The laminations, if employed, reduce eddy current loss and hence reduce current consumption.

In making and assembling the pole pieces, care should be taken to assure that the adjoining front end surfaces which define the gap are flat and substantially parallel to each other. To this end, the end surface of each pole piece is lapped.

After lapping, but before assembly, the end surface of at least one pole piece in each pair ordinarily is given a coating of non-magnetizable material of predetermined thickness. Generally speaking, the higher the desired frequency response the less the thickness. For very high frequencies no coating at all is necessary, for when the lapped ends are disposed as close together as possible, the effective gap is about 0.0005 inch. For moderately high frequencies, a thin copper coating is formed on the end of the pole pieces, simply by dipping the ends for a short time in an aqueous copper sulphate solution. The copper replaces the iron on the dipped surfaces and forms the coating. The thickness of the coating thus formed is controlled by controlling the time of dip and the concentration of the solution.

Figure 3:
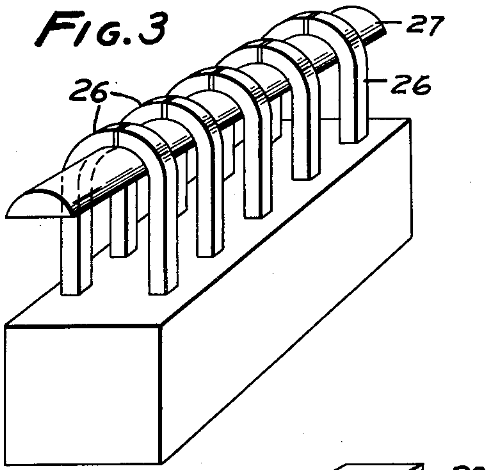
Fig. 3 is a perspective of a jig employed in the manufacture of a pole piece assembly of the multichannel head of Figs. 1 and 2, with the pole piece assembly therein.
Figure 4:
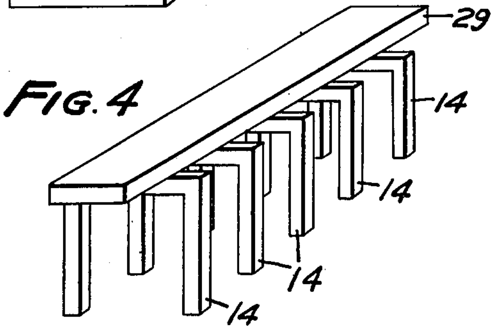
Fig. 4 is a perspective of a base member assembly of the multichannel head of Figs. 1 and 2.

The pole pieces are next placed in the jig illustrated in Fig. 3. The pole pieces of each pair are clamped together by appropriate means, say a small vise. Copper which may have been deposited on the pole pieces at places other than their end surfaces is removed and the elongated half round brass bar is soldered to the inside bottom of the U formed by each pair of abutting pole pieces.

The U-shaped base members are positioned in a second jig (not shown) adapted to hold their respective legs in alignment. The elongated brass strap is soldered across the central portions of the aligned bases.

The U member assembly is placed in the partitioned case with the strap resting in the slots of the end members and extending a short distance beyond each end of the case.

Five pairs of coils are wound in a magnetic series-aiding fashion, i. e. so that the lines of force of the magnetic fields of each pair travel in the same direction. The case is inverted and the coils of each pair are placed respectively around the legs of one of the U's.

The pole piece assembly is then positioned in the case with the pole pieces of each pair respectively in contact with the two legs of a corresponding U. The pole piece assembly and coils are fastened in the box by pouring the insulating cement into each partitioned space.

Individual, as distinguished from multiple heads, are built in the fashion described above, except that only one magnet assembly is made, pole pieces being joined together with the brass spacer or bar, and the magnet assembly being disposed in a small shield box corresponding to one of the compartments of the multichannel head shown in Fig. 1.

To hold the reluctance of the magnetic circuit formed by each pair of pole pieces and the associated U-shaped base member to a minimum, the poles should be held in intimate contact with the legs of the U member.

In operation, the head of the invention preferably is disposed (as shown in Fig. 2) above a tape 30 having a coating 51 of magnetizable material, such as iron oxide. The head is stationary, with its pole pieces disposed as shown and with the tape moving in the direction indicated by the arrow.

Figure 5:
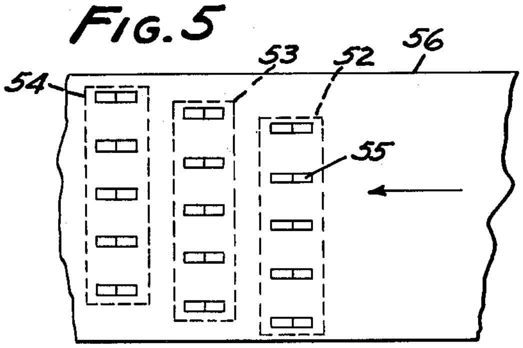
Fig. 5 is a diagram, illustrating the use of three multiple heads, each capable of recording or playing back five channels, the heads being staggered and disposed in echelon so as to accommodate fifteen channels on a single narrow tape.

Fig. 5 is a diagrammatic plan illustrating the use of three of my multiple heads 52, 53, 54, each having five magnet assemblies 55 for simultaneous recording or play-back of fifteen channels on a single magnetizable tape 56 which moves past the heads in the direction of the arrow. The heads are disposed one after another in the direction of movement of the tape, and staggered so that each head has five free channels. This echelon arrangement of heads is advantageous when it is desired to record a large number of channels on a narrow tape. By way of example, fifteen channels may be recorded satisfactorily on a tape only ¾" wide.

As previously indicated, the frequency characteristic of the heads of my invention depend upon the width of the gap. This may vary from as little as 0.0005" (when the two pole pieces are as close together as they can be placed in a practical operation) to as much as ⅛" when the head is designed for very low frequencies.

An air gap is satisfactory, but it is easier to control the width of the gap by placing a non-magnetizable solid material in it.

The material disposed in the gap to hold it may be any non-magnetizable material such as lacquer, copper, brass, etc. Copper is preferred because of the ease with which it can be plated on the pole pieces, and the exactitude with which the thickness of the plating can be controlled. The plating or coating may be placed on one or both pole pieces.

From an examination of Fig. 2, it will be apparent that the pole piece assembly may be withdrawn from the head and replaced. The pole pieces are the only portion of the device which are subject to wear (due to contact with the tape or other recording medium). When wear becomes excessive, it is a simple matter to pull out the pole piece assembly from its sockets in the cement, and replace it with a new one.

I claim:

1. In an electromagnetic head, the combination which comprises a U-shaped magnetizable base member having two legs, magnetizable pole pieces extending longitudinally respectively along the legs of the base member in contact therewith and protruding beyond the ends of the legs, the protruding ends of the pole pieces being separated from each other by a small gap, and a non-magnetizable spacer rigidly fastened to each pole adjacent the gap, the assembly consisting of the pole pieces and the spacer being detachable from the pole pieces by sliding the base member along the legs in the direction in which the pole pieces protrude, and a body of insulating cement cast around the legs of the U-shaped member and the juxtaposed pole pieces and holding the pole pieces to the respective legs in slidable engagement.

2. In a multichannel electromagnetic head, the combination which comprises a plurality of U-shaped magnetizable base members each having two legs, and a connecting base, means rigidly holding the base members side by side with the legs extending in approximately the same direction, a plurality of sets each composed of two magnetizable pole pieces and the number of sets equalling the number of base members with the pole pieces of each set disposed respectively longitudinally in contact with the legs of a base member and protruding in said direction beyond the ends of the legs, the protruding ends of each set of pole pieces being separated from each other by a small gap, and a non-magnetizable spacer rigidly fastened to all the pole pieces adjacent the gaps in each set.

3. Apparatus according to claim 2 in which the gaps between sets of pole pieces are filled with non-magnetizable solid material.

4. Apparatus according to claim 2 in which the assembly consisting of the sets of pole pieces and the spacer fastened thereto is longitudinally slidable with respect to the base members so that it may be detached in the direction in which the pole pieces protrude.

References Cited in the file of this patent

UNITED STATES PATENTS

| | | |
|---|---|---|
| 2,229,326 | Heller | Jan. 21, 1941 |
| 2,277,305 | Clopton | Mar. 24, 1942 |
| 2,503,925 | Tinkham | Apr. 11, 1950 |
| 2,523,576 | Kornei | Sept. 26, 1950 |
| 2,543,483 | Barrett | Feb. 27, 1951 |
| 2,549,771 | Camras | Apr. 24, 1951 |
| 2,563,445 | Zenner | Aug. 7, 1951 |

FOREIGN PATENTS

| | | |
|---|---|---|
| 262,323 | Switzerland | Sept. 16, 1949 |
| 884,881 | France | May 10, 1943 |